United States Patent [19]

Uchibaba et al.

[11] Patent Number: 4,560,049

[45] Date of Patent: Dec. 24, 1985

[54] OPERATION DEVICE FOR CLUTCH MASTER CYLINDER WITH MEANS TO ADJUST THE PLAY STROKE OF THE CLUTCH LEVER

[75] Inventors: Kouichi Uchibaba, Kawagoe; Hirotake Takahashi, Sayama; Chiyomitsu Uchiyama, Miyoshi, all of Japan

[73] Assignee: Honda Giken Kogyo Kabushiki Kaisha, Tokyo, Japan

[21] Appl. No.: 425,986

[22] Filed: Sep. 28, 1982

[51] Int. Cl.[4] .................. F16D 25/12; F16D 13/75
[52] U.S. Cl. .................. 192/85 R; 74/488; 188/196 M; 188/344; 192/99 S; 192/110 R
[58] Field of Search ............. 192/99 S, 85 R, 110 R; 74/488, 501 R, 501.5, 489; 188/344, 196 M

[56] References Cited

U.S. PATENT DOCUMENTS

| | | | |
|---|---|---|---|
| 1,224,997 | 5/1917 | Ballard | 192/99 S X |
| 1,552,368 | 9/1925 | Whitacre | 192/99 S X |
| 2,050,702 | 8/1936 | Jackson | 188/196 M |
| 2,153,042 | 4/1939 | Graziano | 188/196 M |
| 2,472,442 | 6/1949 | Schueler | 74/489 |
| 3,099,340 | 7/1963 | Camp | 192/99 S |
| 3,213,990 | 10/1965 | Gorelov | 192/110 R |
| 3,899,057 | 8/1975 | Carre | 188/344 X |
| 3,935,930 | 2/1976 | Kine | 188/196 M X |
| 4,112,784 | 9/1978 | Cosh | 74/501.5 R |
| 4,304,146 | 12/1981 | Ueda | 74/489 |
| 4,348,916 | 9/1982 | Shimano | 74/489 |
| 4,366,891 | 1/1983 | Maruyama | 192/99 S |
| 4,456,310 | 6/1984 | Hayashi et al. | 188/344 X |
| 4,494,800 | 1/1985 | Hayashi | 188/344 X |

FOREIGN PATENT DOCUMENTS

| | | | |
|---|---|---|---|
| 1056432 | 4/1959 | Fed. Rep. of Germany | 74/489 |
| 2802261 | 7/1978 | Fed. Rep. of Germany | 188/344 |
| 0871012 | 4/1942 | France | 188/344 |
| 0873686 | 7/1942 | France | 192/85 R |
| 1033884 | 7/1953 | France | 74/489 |
| 1135083 | 4/1957 | France | 74/488 |
| 1351885 | 12/1963 | France | 74/489 |
| 1358570 | 3/1964 | France | 188/344 |
| 0401822 | 11/1933 | United Kingdom | 74/501 R |
| 0451225 | 7/1936 | United Kingdom | 74/501.5 |
| 0518932 | 3/1940 | United Kingdom | 74/489 |
| 1005195 | 9/1965 | United Kingdom | 192/85 R |
| 1536353 | 12/1978 | United Kingdom | 188/344 |
| 0755626 | 8/1980 | U.S.S.R. | 192/99 S |

*Primary Examiner*—Rodney H. Bonck
*Attorney, Agent, or Firm*—Armstrong, Nikaido, Marmelstein & Kubovcik

[57] ABSTRACT

An operation device of a clutch master cylinder including a clutch master cylinder slidably incorporating therein a piston and a clutch lever pivotally supported by a pivot on a lever holder and having a piston operating arm. The clutch lever has a bearing hole formed substantially parallel to the pivot and a rotor is turnably fitted into the bearing hole. A push rod which comes into contact with the piston so as to be able to rock is interconnected to the rotor. To adjust the play stroke of the clutch lever, the length of the push rod is adjustable in one embodiment of the invention. In another embodiment, the pivot is fitted to a shaft hole of the clutch lever and the axis of the pivot is eccentrically disposed with respect to the center of the shaft hole.

4 Claims, 8 Drawing Figures

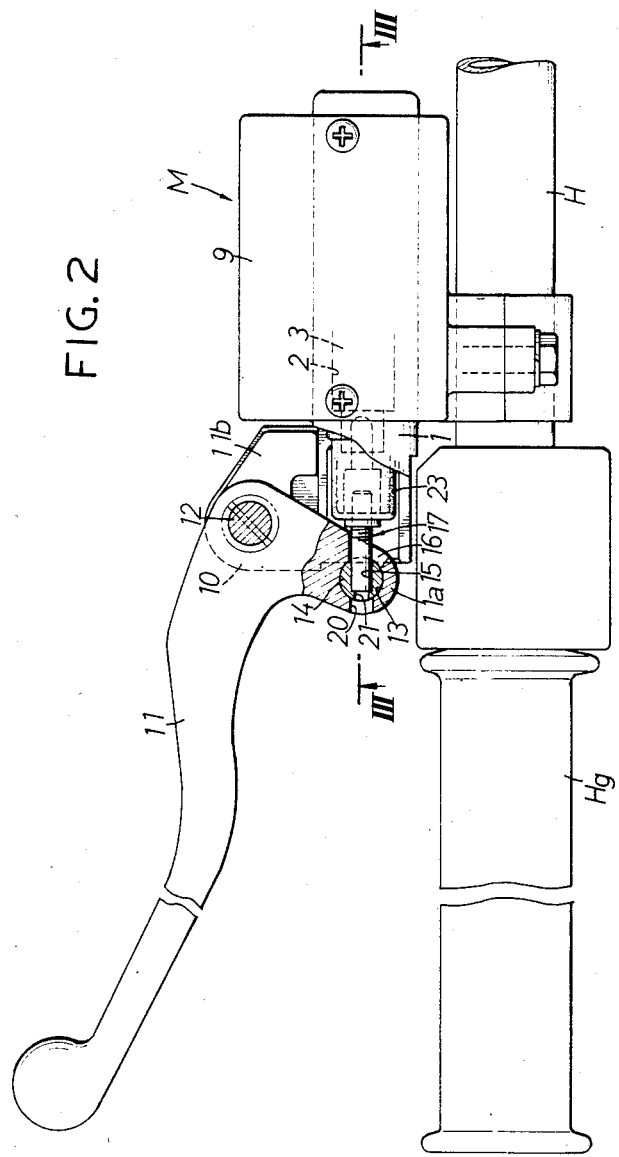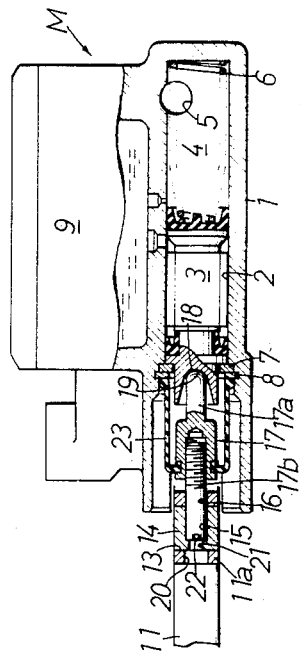

U.S. Patent Dec. 24, 1985 Sheet 3 of 4 4,560,049
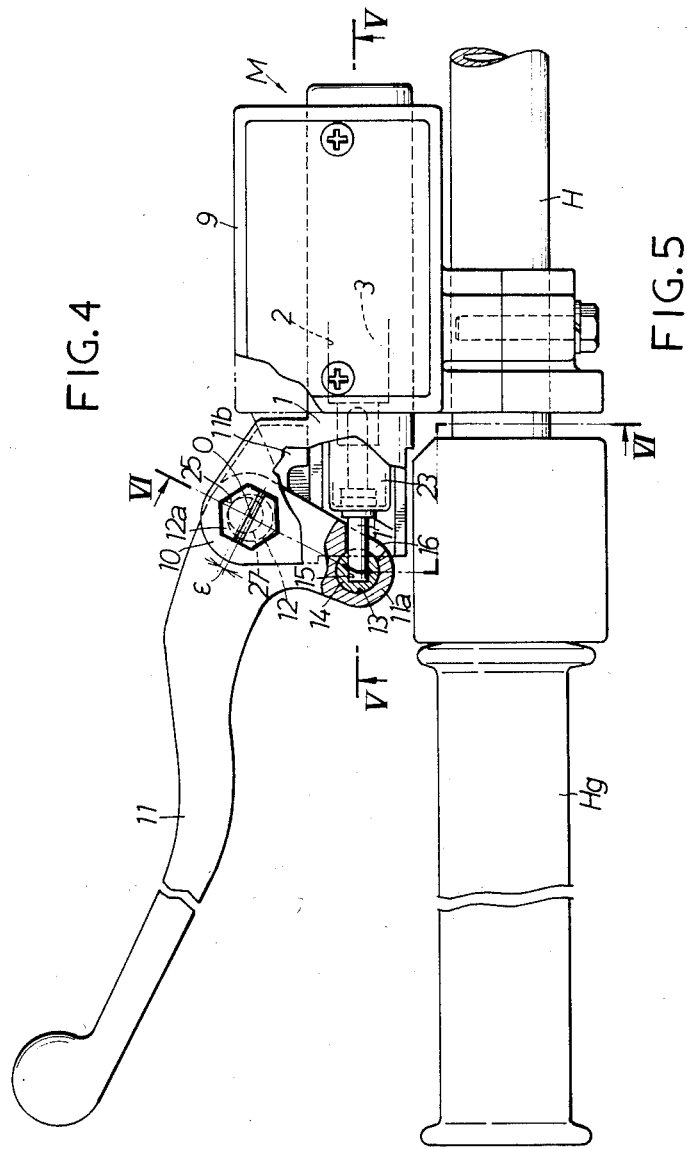

4,560,049

OPERATION DEVICE FOR CLUTCH MASTER CYLINDER WITH MEANS TO ADJUST THE PLAY STROKE OF THE CLUTCH LEVER

BACKGROUND OF THE INVENTION

1. Field of the Invention

This invention relates to an operation device of a clutch master cylinder for controlling an oil pressure clutch interposed in the power system of a motor cycle. More particularly, the present invention relates to an operation device of a clutch master cylinder of the type in which a piston operating arm of a clutch lever pushes a piston of a clutch master cylinder when the clutch lever pivotally supported by a lever holder is rotated.

2. Description of the Prior Art

An operation device of a clutch master cylinder in accordance with the prior art has a construction in which the tip of a piston operating arm of a clutch lever is brought into contact with the rear end of a piston of a clutch master cylinder so as to directly push the piston. According to this construction, the piston causes linear motion whereas the tip of the piston operating arm causes arcuate motion and moreover, the rotating stroke of the clutch lever is by far greater than that of a brake lever. For these reasons, great friction occurs between the piston operating arm and the piston during rotation of the clutch lever thus making the rotating operation of the clutch lever difficult.

SUMMARY OF THE INVENTION

It is therefore an object of the present invention to provide an operation device of a clutch master cylinder of the kind described above which is simple in construction and yet is effective in avoiding the friction between the piston operating arm and the piston and in making the rotation of the clutch lever light and smooth.

It is another object of the present invention to provide an operation device of a clutch master cylinder of the kind described above which can freely adjust the play stroke of the clutch lever.

In accordance with the present invention, there is provided an operation device of a clutch master cylinder which comprises a clutch master cylinder slidably incorporating therein a piston; a clutch lever pivotally supported by a pivot on the lever holder and having a piston operating arm; the clutch lever having a bearing hole formed substantially parallel to the pivot; a rotor turnably fitted into the bearing hole of the clutch lever; and a push rod interconnected to the rotor and coming into contact with the piston in such a manner as to be able to rock.

The operation device described above includes further adjusting means for adjusting the play stroke of the clutch lever.

In accordance with one embodiment of the present invention, the adjusting means described above consist of means for adjusting the length of the push rod. The means in turn consist of a first rod coming into contact with the piston and a second rod screwed to the first rod and interconnected to the rotor and the length of the push rod can be adjusted by changing the screwing position of the second rod.

In accordance with another embodiment of the present invention, the clutch lever has a shaft hole into which the pivot is fitted, and the adjusting means consist of means for adjusting the rotating position of the clutch lever around the pivot by making the axis of the pivot eccentric with respect to the center of the shaft hole of the clutch lever.

The adjusting means for adjusting the rotating position of the clutch lever around the pivot in accordance with one embodiment of the present invention consist of an eccentric portion disposed eccentrically in a predetermined distance with respect to the center of the pivot and engaging turnably with the shaft hole.

Preferably, the eccentric portion described above consists of a cylinder integrally formed with the pivot, the clutch lever has a polygonal locating hole and the pivot has a head of the same shape as that of the locating hole so that the head is fitted into the locating hole with its angular position being adjustable.

In still another embodiment of the present invention, the adjusting means for adjusting the rotating position of the clutch lever around the pivot consist of an eccentric cylinder fitted to the shaft hole in such a manner that the angular position is changeable, and the pivot is fitted into the eccentric cylinder turnably and eccentrically.

Preferably, both eccentric cylinder and shaft hole have a polygonal shape.

The above and other objects, features and advantages of the present invention will become apparent from the following detailed description of a few preferred embodiments when taken in conjunction with the accompanying drawings.

BRIEF DESCRIPTION OF THE DRAWINGS

FIGS. 2 and 3 show one embodiment of the present invention, in which FIG. 2 is a longitudinal sectional plan view of the principal portions and FIG. 3 is a sectional view taken along line III—III of FIG. 2;

FIGS. 4 through 6 show a second embodiment of the present invention, in which FIG. 4 is a perspective view in the same way as FIG. 1, FIG. 5 is a sectional view taken along line V—v of FIG. 4 and FIG. 6 is a sectional view taken along line VI—VI of FIG. 5; and FIGS. 7 and 8 show a third embodiment of the present invention, in which FIG. 7 is a perspective view in the same way as FIG. 6 and FIG. 8 is a sectional view taken along line VIII—VIII of FIG. 7.

DESCRIPTION OF THE PREFERRED EMBODIMENTS

Hereinafter, one embodiment of the present invention will be described with reference to the accompanying drawings.

Figure 1:
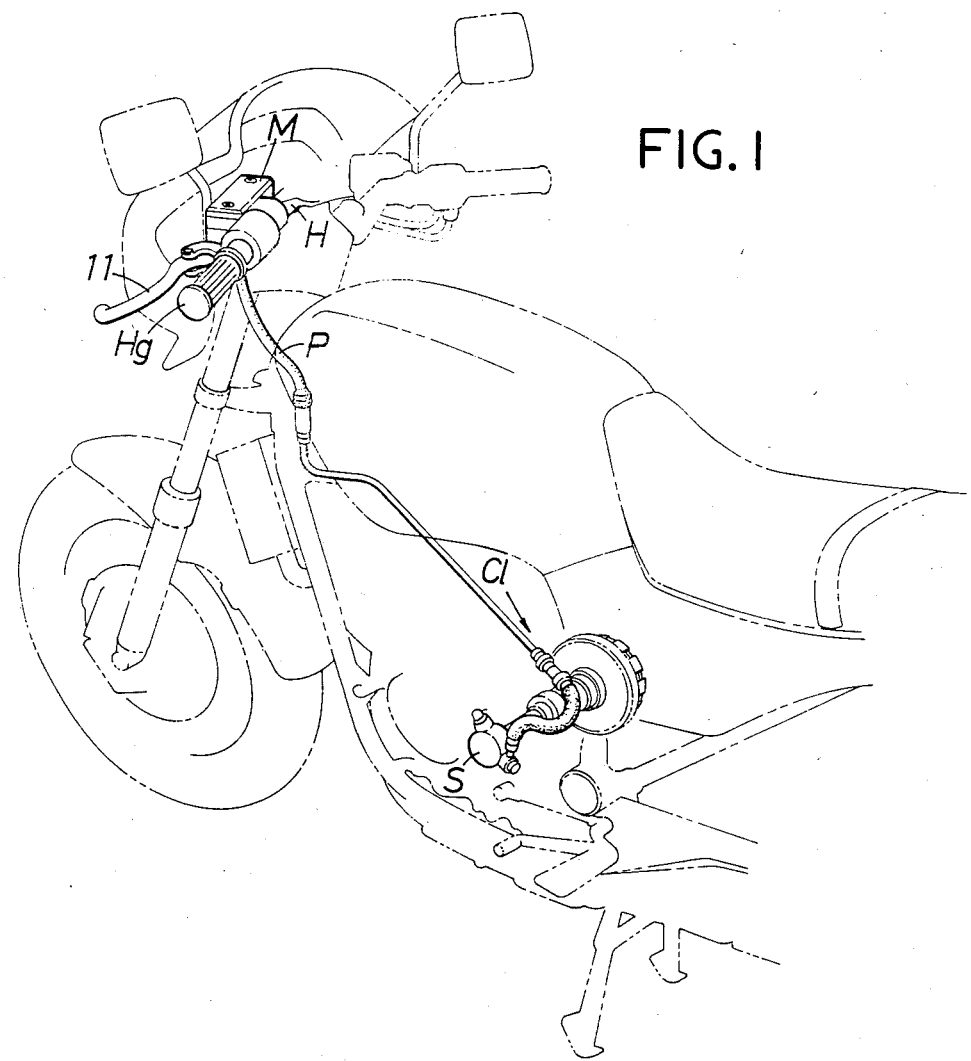
FIG. 1 is a perspective view of a part of a motor cycle equipped with the operation device in accordance with the present invention.

In FIGS. 1 through 3, a clutch master cylinder M is shown fitted to a rod-like steering handle H of a motor cycle close to its left handle grip Hg. The cylinder main body 1 of this clutch master cyliner M has a cylinder hole 2 extending substantially parallel to the handle H and a piston 3 is slidably fitted into this cylinder hole 2. An oil pressure chamber 4 is defined on the front side of the piston 3. An output port 5 is open to this oil pressure chamber 4. An oil passage P communicating with a slave cylinder S of the oil pressure clutch Cl of the power system of the motor cycle is connected to the output port 5.

A return spring 6 is disposed under the compressed state inside the oil pressure chamber 4 so as to urge backward the piston 3 and a stop ring 8 supporting the rear end of the piston 3 via a washer 7 is anchored to the inner wall of the cylinder 2 so as to restrict the limit of backward movement of the piston 3.

An oil tank 9 for supplementing the operation oil to the oil pressure chamber 4 is disposed at the upper part of the cylinder main body 1 and a pair of upper and lower lever holders 10, 10 are integrally formed at the edge portion of the cylinder main body 1 on the side of the handle grip Hg. The base end of a clutch lever 11 is inserted into these lever holders 10, 10 and is pivotally supported by a pivot 12. The clutch lever 11 is integrally equipped at its base end with a piston operating arm 11a opposing the rear end of the piston 3 and with a stopper arm 11b that can come into contact with the cylinder main body 1 in order to restrict the releasing position of the lever 11.

A bearing hole 13 is bored on the piston operating arm 11a substantially in parallel with the pivot 12 and a rotor 14 is turnably fitted into the bearing hole. Preferably, grease is applied to the rotating surface of the rotor 14.

The rotor 14 has a transverse hole 15 and one end of a push rod 17, which passes through an elongated hole 16 bored on the piston operating arm 11a, is turnably fitted into the transverse hole 15. The other end of the push rod 17 is brought into contact with the rear end of the piston 3. The elongated hole 16 extends in the direction in which the push rod 17 rocks with the rotor 14 being its axis. The contact surfaces of the push rod 17 and piston 3 are spherical convexity 18 and spherical concavity 19, respectively, so that the push rod 17 can rock with respect to the piston 3 and the push rod 17 can always push the center portion of the piston 3.

The push rod 17 consists of a first or front rod 17a on the side of the piston 3 and a second or rear rod 17b on the side of the rotor 14 and they 17a, 17b are screwed to each other. Accordingly, the length of the push rod 17 can be suitably adjusted when they are relatively rotated to change their screwing position.

In the embodiment shown, tool insertion holes 20 and 21 reaching the rear end of the rear rod 17b are formed on the piston operating arm 11a and the rotor 14 so that adjustment of the length of the push rod 17 can be made without removing the push rod 17. A tool engaging groove 22 is defined at the rear end of the rod 17b. The tip of a screw driver inserted into the tool insertion holes 20, 21 is engaged with the tool engaging groove 22 and only the rear rod 17b is rotated in order to freely adjust the length of the push rod 17. Retractile waterproofing boots 23 are stretched between the front rod 17a and the inner wall of the cylinder hole 2 and the clamping force of the boots 23 with respect to the front rod 17a checks the rotation of the front rod 17a.

Next, the operation of this embodiment will be explained. When the clutch lever 11 is rotated toward the handle grip Hg around the pivot 12, the piston operating arm 11a moves towards the piston 3 of the clutch master cylinder M so that the arm 11a pushes the piston 3 via the rotor 14 and the push rod 17 and advances it while compressing the return spring 6. At the same time, the oil pressure is generated inside the oil pressure chamber 4 and is transmitted to the slave cylinder S of the oil pressure clutch Cl of the power system from the output port 5 through the oil passage P and cuts off the oil pressure clutch Cl.

In this rotating process of the clutch lever 11, the piston 3 causes linear motion along the cylinder hole 2 whereas the piston operating arm 11a causes arcuate motion with the pivot 12 being the center. Along these motions, the rotor 14 rotates inside the bearing hole 13 and the push rod 17 rocks with respect to the piston 3. Accordingly, the piston operating arm 11a and the piston 3 can smoothly move on their predetermined orbits without causing remarkable friction between them.

When the clutch lever 11 is released, the piston 3 is moved back to the predetermined limit of rearward movement by the resiliency of the return spring 6 and along therewith, the clutch lever 11 also rotates to the predetermined release position. In this case, slight play must be secured between the push rod 17 and the piston 3 or between the stopper arm 11b and the cylinder main body 1 in order to reliably hold the piston 3 at the predetermined limit of its rearward movement. The quantity of this play can be adjusted by adjusting the length of the push rod 17.

Figure 6:
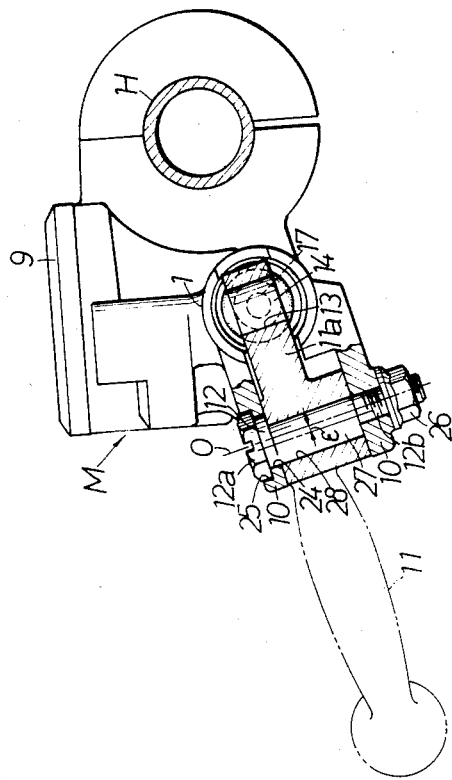

FIGS. 4 through 6 show another embodiment of the present invention. In this embodiment, the push rod 17 is not divided into two parts unlike the first embodiment but consists of a single rod having a predetermined length. To adjust the play stroke of the clutch lever 11, the axis 0 of the pivot 12 is disposed eccentrically with respect to the center of the bearing hole 28 of the clutch lever 11 so as to adjust the rotating position of the clutch lever 11 around the pivot 12. In this embodiment, like reference numerals represent like constituents as in the first embodiment.

The support mechanism of the clutch lever 11 by the pivot 12 will be explained in further detail. The pivot 12 consists of a bolt having a polygonal head 12a such as a hexagonal head and both of its ends are turnably supported by support holes 24, 24 formed on the lever holders 10, 10, respectively. The polygonal head 12a is fitted into a polygonal locating hole 25 that is defined on the upper surface of the lever holder 10. A nut 26 is fitted to a screw portion 12b of the pivot 12 that projects downward from the lower lever holder 10, whereby the pivot 12 is fixed to the upper and lower lever holders 10, 10. An eccentric shaft 27 as an eccentric portion, which is eccentric in a predetermined distance $\epsilon$ from the center 0 of the pivot 12, is integrally formed at the intermediate portion of the pivot 12 which is interposed between both lever holders 10 and 10. This eccentric shaft 27 penetrates through the shaft hole 28 at the base end of the clutch lever 11 and turnably supports the lever 11.

The play between the push rod 17 and the piston 3 or between the stopper arm 11b and the cylinder main body 1 is adjusted in the following way.

First, the nut 26 is sufficiently loosened so as to once release the polygonal head 12a of the pivot 12 from the polygonal locating hole 25. When the pivot 12 is then rotated, the eccentric shaft 27 causes eccentric rotation around the center 0 of the pivot 12 and the clutch lever 11 displaces in such a manner that the clutch lever 11 comes close to, or away from, the cylinder main body 1 or the piston 3, thereby making possible the adjustment of the play of the clutch lever 11. After the rider of the motor cycle obtains desired play in this manner, the polygonal head 12a is again fitted to the polygonal locating hole 25 and the nut 26 is fastened whereby the pivot 12 is prevented from rotating by the locating hole 25. Hence, no error occurs in the play.

Incidentally, the number of steps of play adjustment is decided by the number of angles of the polygon of the head 12a of the pivot 12 and that of the locating hole 25.

Figure 7:
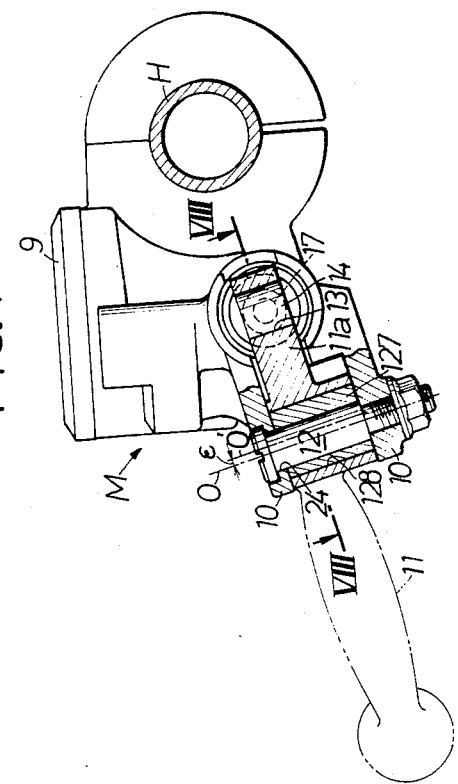
Figure 8:
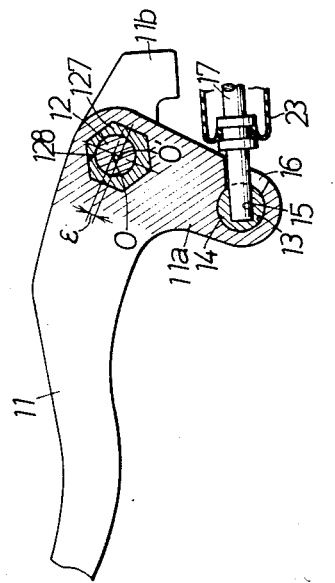

FIGS. 7 and 8 show the third embodiment of the present invention. An eccentric cylinder 127 having a polygonal outer circumference as the eccentric portion is turnably fitted to the intermediate portion of the pivot 12 and is fitted to a shaft hole 128 which is disposed on the clutch lever 11 and has the same polygonal shape as the eccentric cylinder 127. The center 0' of the eccentric cylinder 127 is eccentric by a predetermined quantity $\epsilon$ with respect to the center 0 of the pivot 12. Since the other construction is the same as that of the second embodiment, the same reference numerals are used to identify the same constituents as in the second embodiment.

When the fitting position between the polygonal eccentric cylinder 127 and the polygonal shaft hole 128 is changed and the eccentric cylinder 127 is then rotated, the eccentric cylinder 127 eccentrically rotates around the center 0 of the pivot 12 so that the clutch lever 11 displaces in the same way as in the foregoing embodiments and the play of the lever 11 can be likewise adjusted.

In adjusting the fitting position between the eccentric cylinder 127 and the shaft hole 125, it is of course necessary to remove the pivot 12 from the lever holders 10, 10 and to pull out the clutch lever 11 from between the lever holders, 10, 10.

In summary, the present invention provides the following advantages.

In the present invention, the bearing hole 13 is defined on the piston operating arm 11a of the clutch lever 11 and the push rod 17 coming into contact with the piston 3 of the master cylinder M and capable of rocking is interconnected to the rotor 14 which in turnably fitted into this bearing hole 13. Accordingly, during rotation of the clutch lever 11, since the rotor 14 rotates and the push rod 17 rocks, the piston operating arm 11a and the piston 3 can smoothly operate without generating large friction between them. Hence, the clutch operation becomes remarkably light and smooth.

In accordance with the present invention, the length of the push rod 17 is adjustable. When the length of the push rod 17 is adjusted, eccentric rotation of the eccentric portion such as the eccentric shaft 27, the eccentric cylinder 127 or the like around the center 0 of the pivot 12 can take a suitable angle, so that the play between the lever 11 and the piston 3 under the released state of the clutch lever 11, that is, the play stroke of the clutch lever 11, can be freely adjusted as desired by the driver of the motor cycle.

What is claimed is:

1. An operation device of a clutch master cylinder for motorcycles comprising:
    a steering handle disposed on a body of a motorcycle;
    a clutch master cylinder mounted on the handle and incorporating slidably therein a piston, said piston having a retracted position defined by abutment with a stopper means anchored to an inner wall of the cylinder;
    lever holders;
    a clutch lever pivotally supported by a pivot between said lever holders and having a piston operating arm;
    means for adjusting the play stroke of said clutch lever;
    said piston operating arm having a bearing hole extending substantially parallel to said pivot;
    a rotor turnably fitted into said bearing hole of said clutch lever and having a circular cross-section of a diameter large enough to be provided with a transverse hole therein; and
    a push rod having one and other ends, said one end being inserted into said transverse hole of the rotor for connection between the push rod and the lever, the other end of the push rod being formed as a spherical convexity and coming into contact with a spherically recessed bottom portion of said piston in a swingable manner;
    tool insertion holes being formed on said piston operating arm and said rotor so as to provide an access from the outside to a tip portion of the one end of the push rod inserted into the transverse hole of the rotor, said tip portion having a tool engaging groove provided thereon;
    thereby enabling a tool to be inserted from the outside through said tool insertion holes to be engaged with said tool engaging groove for actuating said adjusting means.

2. An operation device of a clutch master cylinder as defined in claim 1 wherein said adjusting means consist of means for adjusting the length of said push rod.

3. An operation device of a clutch master cylinder as defined in claim 2 wherein said means for adjusting the length of said push rod consist of a first rod coming into contact with said piston and a second rod screwed to said first rod and interconnected to said rotor, and the length of said push rod is adjusted when the screwing position of said second rod is changed.

4. An operation device of a clutch master cylinder as defined in claim 1, wherein said piston operating arm has an elongated hole bored therein for receiving therethrough the one end of the push rod and allowing the push rod to swing about the rotor.

* * * * *